United States Patent
Johnston

(10) Patent No.: US 9,552,123 B1
(45) Date of Patent: Jan. 24, 2017

(54) INTEGRATING APPLICATIONS IN A PORTAL

(75) Inventor: Simon K. Johnston, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1978 days.

(21) Appl. No.: 12/788,485

(22) Filed: May 27, 2010

(51) Int. Cl.
*G06F 3/0482* (2013.01)
*G06F 3/048* (2013.01)

(52) U.S. Cl.
CPC .................................... *G06F 3/048* (2013.01)

(58) Field of Classification Search
CPC .................. G06F 17/30873; G06F 2221/2141; G06F 21/629; Y10S 707/99931
USPC .......................................................... 715/863
See application file for complete search history.

(56) References Cited

U.S. PATENT DOCUMENTS

| | | | |
|---|---|---|---|
| 7,406,664 B1* | 7/2008 | Morton et al. | 715/809 |
| 2006/0129935 A1* | 6/2006 | Deinlein et al. | 715/733 |
| 2011/0154187 A1* | 6/2011 | Sadowski et al. | 715/235 |

* cited by examiner

*Primary Examiner* — Namitha Pillai
(74) *Attorney, Agent, or Firm* — Thomas | Horstemeyer, LLP

(57) ABSTRACT

Disclosed are various embodiments for integrating applications in a portal. A user interface is obtained in one or more computing devices from a first one of a plurality of applications. The user interface includes an identification of an object instance associated with an object type. A list of views associated with a second one of the applications is obtained. One or more of the views are configured to represent the object type. A modified user interface is generated from the user interface according to the identification of the object instance and the list of views. The modified user interface includes a component for selecting one of the views to represent the object instance.

24 Claims, 5 Drawing Sheets

US 9,552,123 B1

INTEGRATING APPLICATIONS IN A PORTAL

BACKGROUND

Merchants who sell products online may have vast amounts of data related to the operation of their enterprise. Various individuals may access such data for various purposes using predefined applications that are configured to provide the desired access to the data. Unfortunately, as a merchant grows in size, the number of applications needed to access all of the various types of data relating to the enterprise can also grow. Consequently, it may be difficult to manage the development of the applications so that each application may coordinate with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to integrating applications in a portal where the interface between the applications is generated by the portal. As a non-limiting example, a first application may have a configuration that indicates that the first application provides views and/or actions for an object type. As another non-limiting example, a second application may have a user interface that identifies an instance of that object type. The portal may be configured to facilitate navigation from the user interface of the second application to the views and/or actions provided by the first application and other applications for the instance of the object type. In the following discussion, a general description of the system and its components is provided, followed by a discussion of the operation of the same.

Figure 1A:
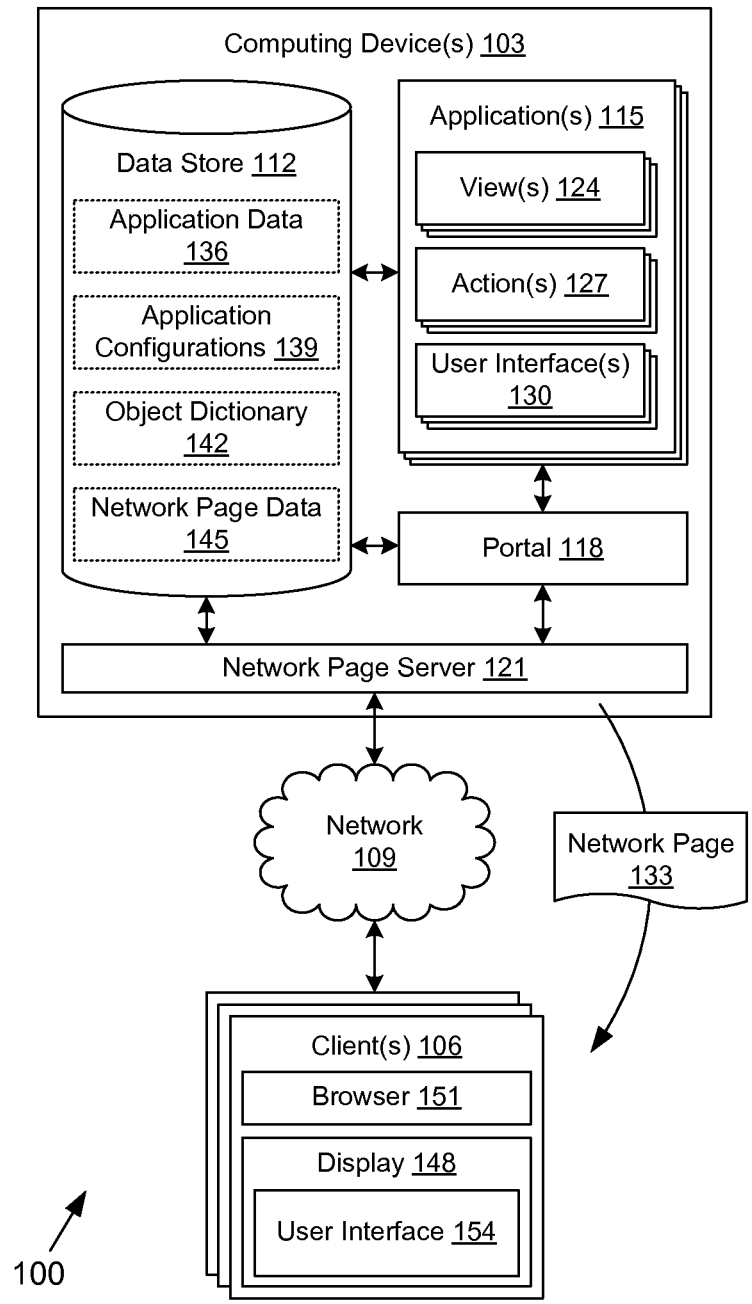
FIGS. 1A and 1B are drawings of a networked environment according to various embodiments of the present disclosure.

With reference to FIG. 1A, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks, computer banks, or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a plurality of applications 115, a portal 118, a network page server 121, and other applications, services, processes, systems, engines, or functionality not discussed in detail herein. The applications 115 are executed, for example, to render views of, and perform manipulation of, data. Each application 115 may comprise one or more views 124, one or more actions 127, one or more user interfaces 130, and/or other features. Each view 124 is configured to render information for a type of data object, as is understood, for example, according to the model-view-controller architectural design pattern in software engineering. To this end, a view 124 may comprise a user interface. Each action 127 represents functionality that may be applied to a data object. Each user interface 130 corresponds to other user interfaces for the application, which may or may not comprise a view 124 for a data object.

The portal 118 is executed to integrate the applications 115 with one another by providing a common interface for the applications 115. To this end, the portal 118 is configured to generate network pages 133, such as web pages or other network content, to integrate views generated by the various applications 115. The network page server 121 is executed to serve up the network pages 133 to the clients 106 over the network 109 by way of hypertext transfer protocol (HTTP) or other protocols. In various embodiments, the network page server 121 may comprise a commercially available HTTP server application, such as Apache® HTTP Server, Microsoft® Internet Information Services (IIS), or other applications.

The data stored in the data store 112 includes, for example, application data 136, application configurations 139, an object dictionary 142, network page data 145, and potentially other data. The application data 136 comprises instances of data objects that are used by one or more of the applications 115. The instances may be serialized in a format such as, for example, Java Script Object Notation (JSON), YAML, Java object serialization, extensible markup language (XML), Abstract Syntax Notation One (ASN.1), or other serialization formats that may be stored in the application data 136.

The application configurations 139 comprise files or documents that may be associated with each of the applications 115 for purposes of integration with the other applications 115 by way of the portal 118. In an application configuration 139, an application 115 may declare that it provides one or more views 124 for a type of data object or that it is capable of performing one or more actions 127 for a type of data object. An application configuration 139 may relate to a multitude of data object types if desired.

In one embodiment, the object dictionary 142 is used by the portal 118 to parse the application configurations 139. A certain type of object may be referred to in the application configurations 139 by one or more strings from the object dictionary 142. The object dictionary 142 may also contain code or other configurations to enable the parsing and/or recognition of identifications of particular instances of data object types so that they may be located within the application data 136. The network page data 145 may include, for example, templates, hypertext markup language (HTML) data, XML data, images, audio, video, and/or other data used in the generation of the network pages 133.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include a display 148. The display 148 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 151 and/or other applications. The browser 151 may be executed in a client 106, for example, to access and render network pages 133, such as web pages or other network content served up by the computing device 103 and/or other servers. A user interface 154 may be displayed on the display 148. The client 106 may be configured to execute applications beyond the browser 151 such as, for example, email applications, instant message applications, and/or other applications.

Next, a general description of the operation of the various components of the networked environment 100 is provided. To begin, a user at a client 106 may request a network page 133 from the portal 118 that enables the selection of a particular application 115. To this end, the applications 115 may be registered with the portal 118 by way of the application configurations 139 so that the portal 118 has a list of applications 115 that are available. The user may then select an application 115 and request a user interface 130 associated with the application 115. The user interface 130 may be integrated within a network page 133 generated by the portal 118 by using frames, tables, and/or other techniques.

Within the user interface 130 may be one or more identifications of instances of data objects. In one embodiment, an identification of an instance of a data object type in the user interface 130 is provided by way of XML or other markup code that may be interpreted by the portal 118. In another embodiment, no markup is used to identify an instance of a data object type in the user interface 130. In such a case, the portal 118 may be configured to determine based on rules or heuristics whether an instance of a data object type is present. Such a determination may be based, for example, on a predefined format for the instance of the data object type that is distinguishable from ordinary text. The data objects may be of varying types. Non-limiting examples of data object types may include items, vendors, orders, and other data object types. The identifications may be made in accordance with a format specified in the object dictionary 142.

The portal 118 processes the user interface 130 to determine whether identifications of instances of object types are present. Upon determination that an identification of an instance of an object type is present, the portal 118 will include one or more user interface components as a navigational aid to select views 124 or actions 127 provided by the current application 115 or other applications 115. Thus, the portal 118 determines from the application configurations 139 which views 124 and/or actions 127 are applicable for the object type. In one embodiment, the portal 118 configures an existing component of the user interface 130 for selecting or launching the navigational aid.

The navigational aid may comprise a pop-up menu, pop-over menu, side bar, pop-up window, list of links, list of buttons, or any other combinations of components to allow a user to indicate a selection of a view 124 or action 127. The navigational aid may be hidden until a user performs an action within the user interface 130, such as, for example, clicking on the identification of the instance, hovering over the identification of the instance, or another action. The views 124 and/or actions 127 in the navigational aid may be tied to the particular instance identified in the user interface 130 so that a selection of the view 124 will launch the view 124 for that particular instance or that a selection of the action 127 will execute the action 127 for that particular instance.

In one embodiment, the navigational aid comprises code that is stored within the network page 133. However, the navigational aid may include client-side code that obtains further data over the network 109, using simple object access protocol (SOAP), Ajax, Java Script, and/or other technologies. In one embodiment, the views 124 and/or actions 127 are not obtained by the client 106 until the navigational aid is triggered for the identification of the object type.

When a view 124 is launched from the portal 118, the view 124 may take the place of the user interface 130 within the user interface 154 comprising the rendered network page 133. Alternatively, the view 124 may be launched in a separate browser 151 window or in a separate frame, viewport, or display region within the user interface 154.

In various embodiments, each of the applications 115 has no code-based linkage to any other one of the applications 115. Such an approach may simplify development of the applications 115, which may be developed by different teams or entities. The different teams or entities may need to agree only on what objects are called, such as what is specified in the object dictionary 142. The integration of the applications 115 is thereby provided by the portal 118 by interpreting the application configurations 139 and the user interfaces 130.

Figure 1B:
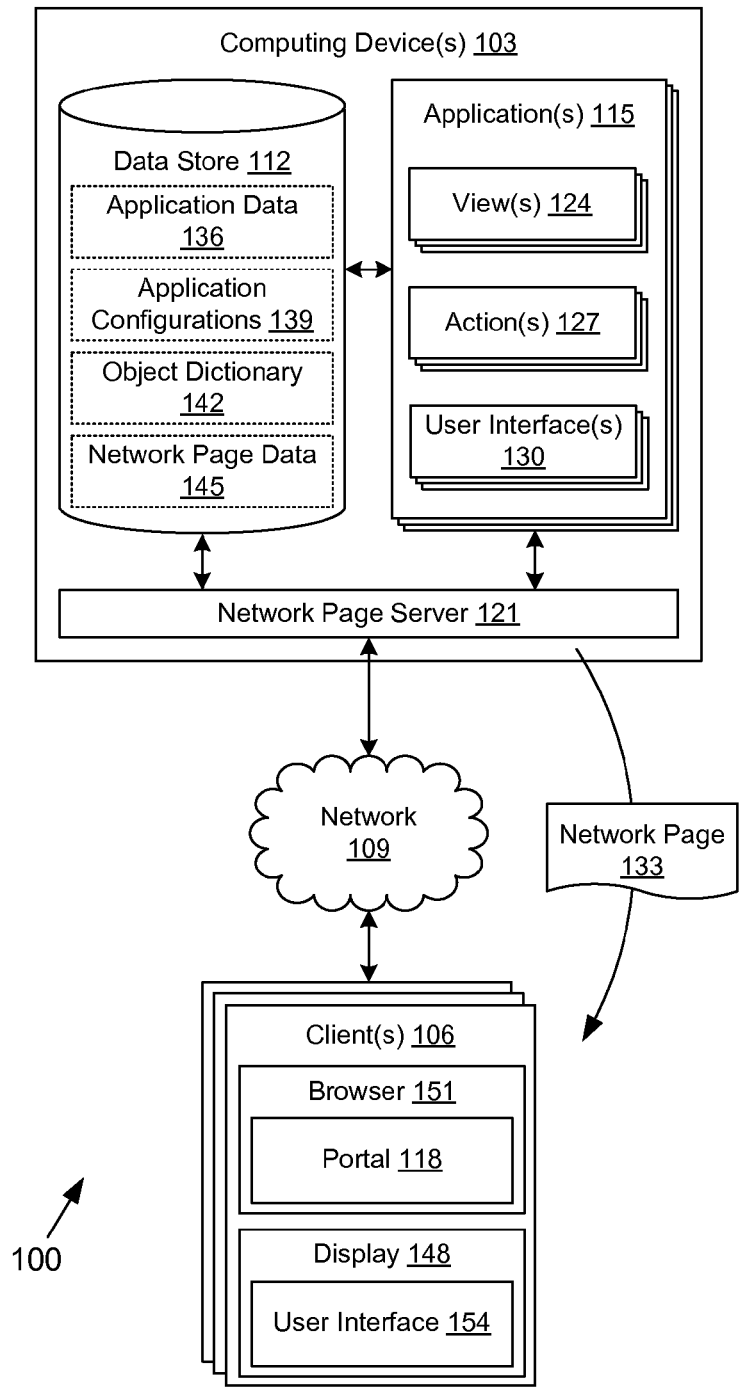

Moving now to FIG. 1B, shown is another example of a networked environment 100. In FIG. 1B, the portal 118 is executed on the client 106. In one non-limiting example, the portal 118 comprises code (e.g., Java Script or other client-side code) that is executed within a browser 151. In another non-limiting example, the portal 118 comprises code (e.g., Flash or other client-side code) that is executed outside of the browser 151.

In FIG. 1B, the portal 118 may be configured to preprocess and, in some embodiments, request network pages 133 served up by the network page server 121. Although the portal 118 is executed on the client 106, the functionality provided by the portal 118 may be substantially similar. For example, the portal 118 may be configured to allow navigation between applications 115 based on views 124 and/or actions 127 declared in application configurations 139 and identification of object instances within a user interface 130. The application configurations 139 may be retrieved by the portal 118, for example, from the computing device 103 whenever needed or may be cached in a local cache on the client 106.

Figure 2:
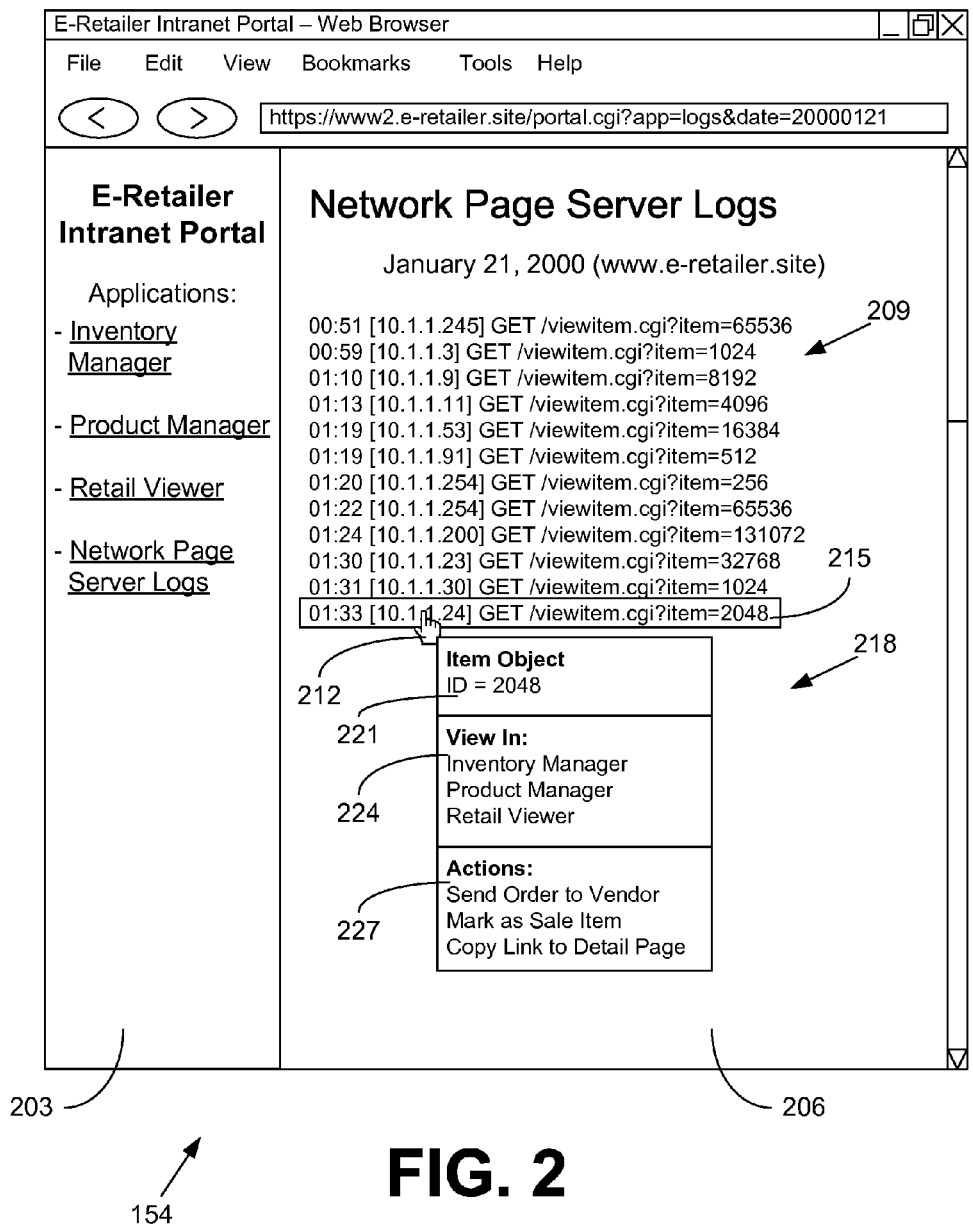
FIG. 2 is a drawing of an example of a user interface rendered by a client in the networked environment of FIG. 1A according to an embodiment of the present disclosure.

Turning now to FIG. 2, shown is an example of a user interface 154 rendered by a client 106 (FIG. 1A) in the networked environment 100 (FIG. 1A) according to one embodiment. The user interface 154 may comprise one or more network pages 133 (FIG. 1A) being rendered in a browser 151. In this example, the user interface 154 has two primary display regions 203, 206, which may comprise frames, table cells, etc. within a network page 133.

The display region 203 includes a menu of links to the various applications 115 (FIG. 1A) registered with the portal 118 (FIG. 1A). Such a menu may be generated dynamically by the portal 118 based on the current status of the applications 115 as being registered with the portal 118. Such a menu may also be generated by the portal 118 in response to a registration or deregistration event received by the portal 118 regarding one or more applications 115. Each of the links is to a user interface 130 (FIG. 1A) generated by the respective application 115. In this example, links are provided to an inventory manager, a product manager, a retail viewer, and to network page server logs.

The display region 206 corresponds to a user interface 130 generated by an application 115. In this example, the user interface 130 is provided for a network page server logs application 115. The display region 206 includes a list of network page requests 209. Each request in the depicted list of network page requests 209 corresponds to an identification of an instance of a data object type. In particular, each request is a request for a network page 133 related to an item, which may be an object type as defined in the object dictionary 142. The XML or other markup language used to specify the display region 206 may include code that indicates the association of each request in the list of network page requests 209 with an identification of an item, if applicable. In other examples, a request may be associated with an internet protocol (IP) address object type, a browser 151 (FIG. 1A) object type, a network page 133 resource object type, or any other appropriate object type.

In the example of FIG. 2, a cursor 212 has selected one request from the list of network page requests 209. The selected object identification 215 is used to provide a navigational aid 218 for the applications 115 in the portal 118. The navigational aid 218 is illustrated in the form of a pop-over menu, but any other type of user interface component allowing for user selection from multiple items may be used instead. The navigational aid 218 may include a description 221 of the object instance, which in this example includes the name of the object type ("Item") and the identifier of the instance ("2048").

The navigational aid 218 may also include a list of views 224 associated with the object type and a list of actions 227 associated with the object type. The list of views 224 and list of actions 227 may be generated automatically by the portal 118 after reading the application configurations 139 to determine which applications 115 provide views 124 (FIG. 1A) and/or perform actions 127 (FIG. 1A) for the given object type. When a user selects a link to a view 124 or a link to an action 127, a request may be sent to the portal 118 or respective application 115 for the selected view 124 or action 127 to be generated or performed for the corresponding instance of the item.

In the non-limiting example of FIG. 2, links to three views 124 for an item are rendered in the list of views 224. The three views 124 comprise an inventory manager view, a product manager view, and a retail view. The inventory manager view may be associated with an inventory manager application and may, for example, enable a user to see the quantities of items currently in inventory. The product manager view may be associated with a product manager application and may, for example, enable a user to modify attributes associated with the item, such as title, descriptions, price, shipping weight, hazardous material classification, and so on. The retail view may be associated with a retail viewer application and may, for example, enable a user to view an item as it would be rendered within a detail network page 133 served up on a retail network site. It is understood that not every application 115 may offer views 124 for a particular object type, and an application 115 may offer multiple views 124 for a particular object type in other examples.

In the non-limiting example of FIG. 2, links to three actions 127 for an item are rendered in the list of actions 227. The three actions 127 comprise a send order to vendor action, a mark as sale item action, and a copy link to detail page action. The send order to vendor action may be associated with an inventory manager application and may, for example, enable a user to generate and send an order for the item to a vendor. The mark as sale item action may be associated with a product manager application and may, for example, enable a user to mark the item as a sale item, which may include a price adjustment, product highlighting adjustment, and other adjustments. The copy link to detail page action may be associated with a retail viewer application and may, for example, enable a user to copy a uniform resource locator (URL) to the detail network page 133 of the item from the retail network site to the system clipboard. It is understood that not every application 115 may offer actions 127 for a particular object type, and an application 115 may offer multiple actions 127 for a particular object type in other examples.

Figure 3:
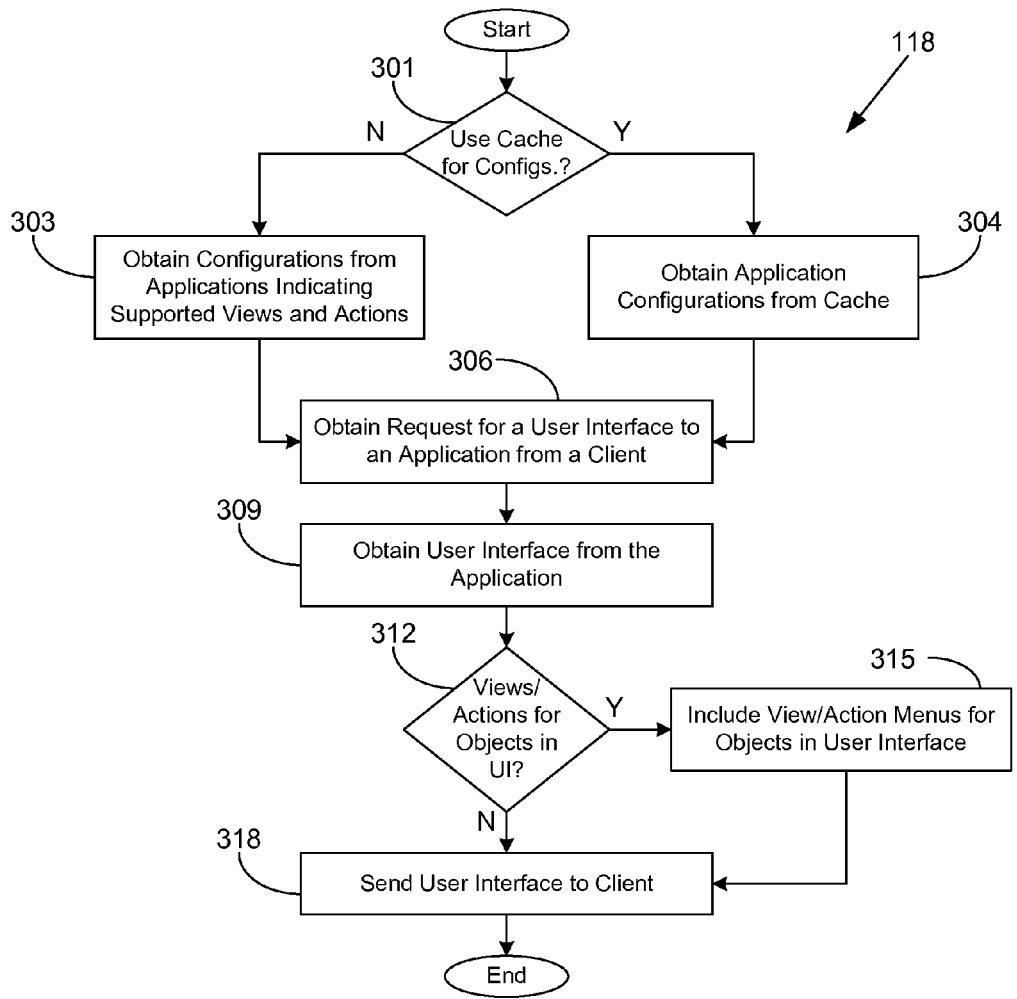
FIG. 3 is a flowchart illustrating one example of functionality implemented as portions of a portal executed in a computing device in the networked environment of FIG. 1A according to various embodiments of the present disclosure.

Referring next to FIG. 3, shown is a flowchart that provides one example of the operation of a portion of the portal 118 according to various embodiments. It is understood that the flowchart of FIG. 3 provides merely an example of the many different types of functional arrangements that may be employed to implement the operation of the portion of the portal 118 as described herein. As an alternative, the flowchart of FIG. 3 may be viewed as depicting an example of steps of a method implemented in the computing device 103 (FIG. 1A) or a client 106 (FIG. 1B) according to one or more embodiments.

Beginning with box 301, the portal 118 determines whether to use a cached copy of the application configurations 139 (FIG. 1A). The application configurations 139 indicate views 124 (FIG. 1A) and/or actions 127 (FIG. 1) supported by applications 115 (FIG. 1A). If a cached copy is not to be used, the portal 118 moves to box 303 and obtains the application configurations 139 that indicate supported views 124 and/or actions 127 from the computing device(s) 103. In one embodiment, the portal 118 may obtain the application configurations 139 from the respective applications 115 directly. In other embodiments, the portal 118 may obtain the application configurations 139 from the data store 112 or from one or more data files. Otherwise, if a cached copy of the application configurations 139 is to be used, the portal 118 proceeds to box 304 and obtains the application configurations 139 from a cache, either on the computing device 103 or on the client 106 (FIG. 1B).

Next, in box 306, the portal 118 obtains a request for a user interface 130 (FIG. 1A) to an application 115 from a client 106 (FIG. 1A) or a user at a user interface 154 (FIG. 1B). In box 309, the portal 118 proceeds to obtain the requested user interface 130 from the respective application 115.

In box 312, the portal 118 parses the user interface 130 and determines whether there are any views 124 or actions 127 for identified instances of objects in the user interface 130. In other words, for each object type, views 124 and actions 127 supported by various applications 115 are determined. In one non-limiting example, the portal 118 may examine the user interface 130 for predefined markup that designates instances of an object type. In another non-limiting example, the portal 118 may examine the user interface 130 and determine by way of heuristics or rules whether an instance of an object type is present. An instance of a certain object type may use, for example, a certain format that is distinguishable from other text.

For each identification of an instance of the object type, the portal 118 may include menus of views 124 and/or actions 127 as appropriate for the instances of the object type in the user interface 130. The portal 118 then sends the modified user interface 130 to the client 106 in box 318. Thereafter, the portion of the portal 118 ends.

If, instead, in box 312, the portal 118 determines that there are no views 124 and/or actions 127 for any object instances in the user interface 130, the portal 118 proceeds directly to box 318 and sends the unmodified user interface 130 to the client 106. Thereafter, the portion of the portal 118 ends.

Figure 4:
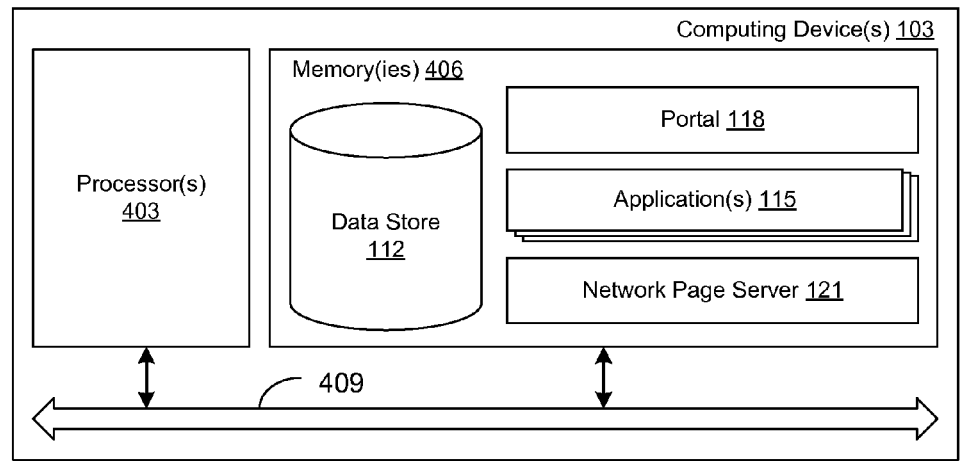
FIG. 4 is a schematic block diagram that provides one example illustration of a computing device employed in the networked environment of FIG. 1A according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the applications 115, the portal 118, the network page server 121, and potentially other applications. Also stored in the memory 406 may be a data store 112 and other data. In addition, an operating system may be stored in the memory 406 and executable by the processor 403.

Figure 5:
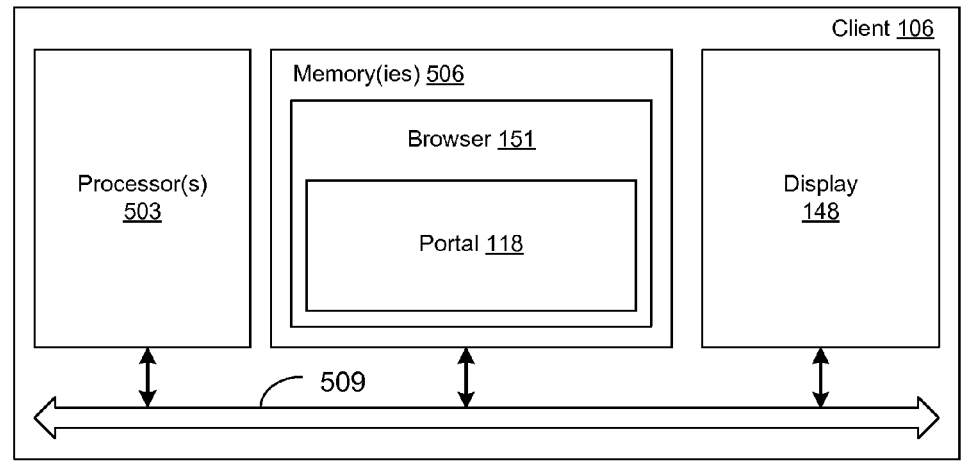
FIG. 5 is a schematic block diagram that provides one example illustration of a client computing device employed in the networked environment of FIG. 1B according to various embodiments of the present disclosure.

Referring next to FIG. 5, shown is a schematic block diagram of the client 106 according to an embodiment of the present disclosure. The client 106 includes at least one processor circuit, for example, having a processor 503 and a memory 506, both of which are coupled to a local interface 509. To this end, the client 106 may comprise, for example, a client computer or like device. The local interface 509 may comprise, for example, a data bus with an accompanying address/control bus or other bus structure as can be appreciated. A display 148 may be coupled to the local interface 509.

Stored in the memory 506 are both data and several components that are executable by the processor 503. In particular, stored in the memory 506 and executable by the processor 503 are the browser 151, the portal 118, and potentially other applications. An operating system may also be stored in the memory 506 and executable by the processor 503.

Referring now to both FIGS. 4 and 5, it is understood that there may be other applications that are stored in the memories 406, 506 and are executable by the respective processors 403, 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memories 406, 506 and are executable by the respective processors 403, 503. In this respect, the term "executable" means a program file that is in a form that can ultimately be run by the processors 403, 503. Examples of executable programs may be, for example, a compiled program that can be translated into machine code in a format that can be loaded into a random access portion of the memories 406, 506 and run by the respective processors 403, 503, source code that may be expressed in proper format such as object code that is capable of being loaded into a random access portion of the memories 406, 506 and executed by the respective processors 403, 503, or source code that may be interpreted by another executable program to generate instructions in a random access portion of the memories 406, 506 to be executed by the respective processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406, 506 are defined herein as including both volatile and nonvolatile memory and data storage components. Volatile components are those that do not retain data values upon loss of power. Nonvolatile components are those that retain data upon a loss of power. Thus, the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 403, 503 may represent multiple processors 403, 503 and the memories 406, 506 may represent multiple memories 406, 506 that operate in parallel processing circuits, respectively. In such a case, the local interfaces 409, 509 may be an appropriate network 109

(FIGS. 1A & 1B) that facilitates communication between any two of the multiple processors 403, 503, between any processor 403, 503 and any of the memories 406, 506, or between any two of the memories 406, 506, etc. The local interfaces 409, 509 may comprise additional systems designed to coordinate this communication, including, for example, performing load balancing. The processors 403, 503 may be of electrical or of some other available construction.

Although the applications 115, the portal 118, the network page server 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the portal 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403, 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the applications 115, the portal 118, and the network page server 121, that comprises software or code can be embodied in any non-transitory computer-readable medium for use by or in connection with an instruction execution system such as, for example, a processor 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
    obtain a user interface from a first one of a plurality of applications, the user interface including an identification of an object instance associated with an object type;
    obtain a list of views associated with a second one of the applications, at least one of the views being configured to represent the object type;
    obtain a list of actions associated with a third one of the applications, at least one of the actions being applicable to the object type; and
    generate a modified user interface from the user interface according to the identification of the object instance, the list of views, and the list of actions, the modified user interface including a first component for selecting one of the at least one of the views to represent the object instance and a second component for selecting one of the at least one of the actions to be applied to the object instance, the first component and the second component being included within a menu of the modified user interface.

2. The non-transitory computer-readable medium of claim 1, wherein the program is configured to be executed in a client, and when executed, the program causes the client to at least obtain the user interface, the list of views, and the list of actions over a data communications network.

3. The non-transitory computer-readable medium of claim 1, wherein the list of views and the list of actions are embodied in a document.

4. A system, comprising:
    at least one computing device;
    a plurality of applications executable in the at least one computing device, wherein, when executed, a first one of the applications causes the at least one computing device to at least provide a view for an object type, and, when executed, a second one of the applications causes the at least one computing device to at least generate a user interface including an identification of an object instance associated with the object type; and a portal that is executable in the at least one computing device, wherein when executed, the portal causes that at least one computing device to at least:
obtain the user interface from the second one of the applications;
associate the identification of the object instance with the view for the object type provided by the first one of the applications; and
modify the user interface to include a component for selecting the view for the object instance provided by the first one of the applications, thereby generating a modified user interface.

5. The system of claim 4, wherein, when executed, the portal further causes the at least one computing device to at least:
obtain a request for the user interface from a client; and
send the modified user interface to the client.

6. The system of claim 4, wherein the portal is configured to be executed in a client, and, where executed the portal further causes the client to at least:
obtain the user interface from one of the at least one computing device; and
render the modified user interface in the client.

7. The system of claim 4, further comprising a portal distribution application executable in the at least one computing device, wherein, when executed, the portal distribution application causes the at least one computing device to at least distribute code implementing the portal to at least one client.

8. The system of claim 4, wherein associating the identification of the object instance with the view for the object type further comprises determining that the identification is present in the user interface based at least in part on at least one rule regarding a format of the identification.

9. The system of claim 4, wherein associating the identification of the object instance with the view for the object type further comprises determining that the identification is present in the user interface based at least in part on markup code indicating the identification.

10. The system of claim 4, wherein the user interface comprises a network page.

11. The system of claim 4, wherein a third one of the applications includes logic for performing an action on the object type.

12. The system of claim 11, wherein, when executed, the portal further causes the at least one computing device to at least modify the user interface to include a component for invoking the action performed by the third one of the applications on the object instance.

13. The system of claim 12, wherein the component for invoking the action is further configured for selecting the action to be invoked from a plurality of actions performed by a plurality of the applications.

14. The system of claim 4, wherein modifying the user interface configures an existing component of the user interface.

15. The system of claim 4, wherein the component for selecting the view is further configured for selecting the view from a plurality of views for the object type provided by a plurality of the applications.

16. The system of claim 4, wherein individual ones of the applications are associated with at least one data file declaring which of the views the respective application is configured to provide and which actions the respective application is configured to perform for object instances of the object type.

17. The system of claim 16, wherein, when executed, the portal further causes the at least one computing device to at least read the at least one data file associated with the individual ones of the applications.

18. A method, comprising:
obtaining, via one or more computing devices, a user interface from a first one of a plurality of applications, the user interface including an identification of an object instance associated with an object type;
obtaining, via the one or more computing devices, a list of views associated with a second one of the applications, at least one of the views being configured to represent the object type; and
generating, via the one or more computing devices, a modified user interface from the user interface according to the identification of the object instance and the list of views, the modified user interface including a component for selecting one of the at least one of the views to represent the object instance.

19. The method of claim 18, further comprising obtaining, via the one or more computing devices, a list of actions associated with a third one of the applications, at least one of the actions being applicable to the object type.

20. The method of claim 19, wherein generating the modified user interface further comprises generating, via the one or more computing devices, the modified user interface from the user interface according to the identification of the object instance and the list of actions, the modified user interface further including a component for selecting one of the at least one of the actions to be applied to the object instance.

21. The method of claim 18, wherein generating the modified user interface further comprises modifying via the one or more computing devices, an existing component of the user interface to include the component.

22. The method of claim 18, further comprising:
obtaining via the one or more computing devices, a request for the user interface from a client; and
sending via the one or more computing devices, the modified user interface to the client.

23. The method of claim 18, wherein the one or more computing devices comprises a client, and the method further comprises:
obtaining, in the client, the user interface from a server; and
rendering, in the client, the modified user interface for display.

24. The method of claim 18, wherein the list of views is specified in a declarative format in at least one data file associated with the second one of the applications.

* * * * *